Aug. 4, 1925.

R. HAUENSTEIN 1,548,462

DETACHABLE SPOUT FOR SEALED CANS

Filed March 9, 1925

INVENTOR
Rudolf Hauenstein
BY
ATTORNEY

Patented Aug. 4, 1925.

1,548,462

UNITED STATES PATENT OFFICE.

RUDOLF HAUENSTEIN, OF BROOKLYN, NEW YORK.

DETACHABLE SPOUT FOR SEALED CANS.

Application filed March 9, 1925. Serial No. 13,980.

*To all whom it may concern:*

Be it known that I, RUDOLF HAUENSTEIN, a citizen of Germany, residing at Brooklyn, in the county of Kings and State of New York, have invented certain new and useful Improvements in Detachable Spouts for Sealed Cans, of which the following is a specification.

This invention relates to a detachable spout for sealed cans such as are used to contain condensed milk, the invention having for an object the provision of a novel attachment which can be applied to the top of such a can to permit of pouring the milk therefrom, and which is of a sanitary nature.

For further comprehension of the invention and of the objects and advantages thereof, reference will be had to the following description and accompanying drawing, and to the appended claims in which the various novel features of the invention are more particularly set forth.

Fig. 1 of the drawing is a longitudinal sectional view showing my improved device applied to a can, the latter being shown partly in side elevation.

Figure 1:
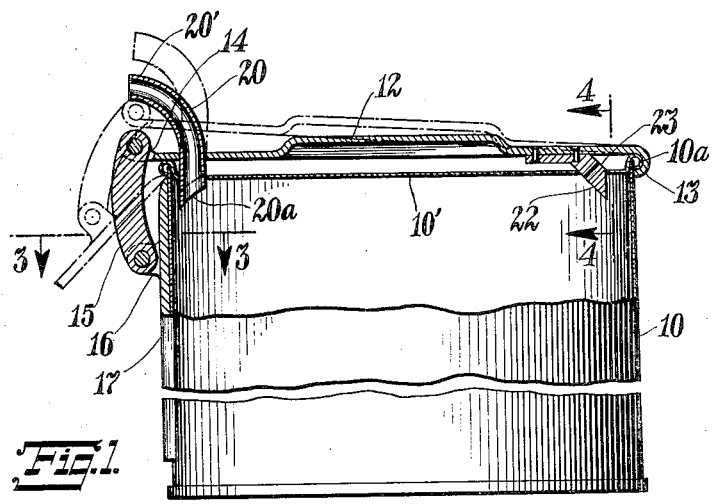
Figure 4:
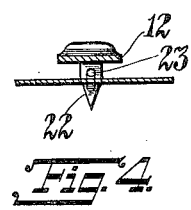
Fig. 4 is a fragmentary vertical sectional view taken on the line 4—4 of Fig. 1.
Figure 2:
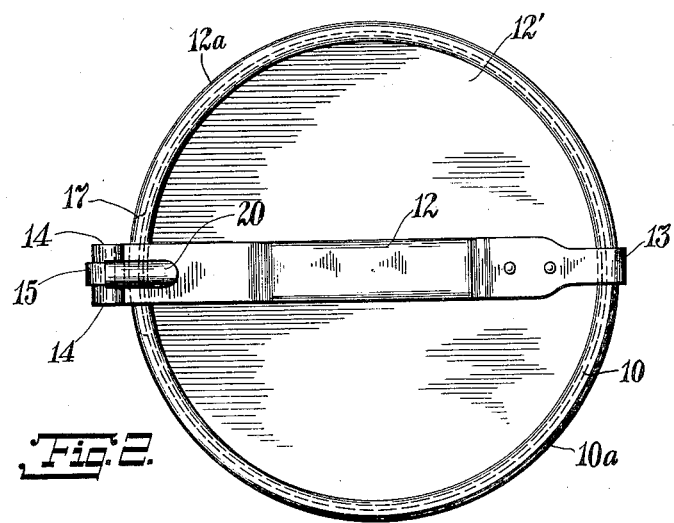
Fig. 2 is a plan view.
Figure 3:
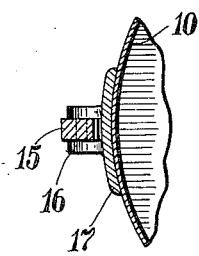
Fig. 3 is a fragmentary horizontal sectional view taken on the line 3—3 of Fig. 1.

In the drawing the reference numeral 10 indicates an ordinary sealed can of the type used as a container for condensed milk, the top of the can, to which my improved device is applied being indicated specifically at 10'. My improved device comprises a flat bar 12 that has a downturned hook 13 at one end that is adapted to be engaged under the usual circumferential bead $10^a$ at the top of the can, this bar being extended diametrically across the can when the device is in place on the latter. The bar 12 is of slightly greater length than the diameter of the can so that its opposite end may project slightly beyond the adjacent side of the can. This opposite end of the bar is formed with hinge lugs or ears 14 to which one end of a short link 15 is connected as shown. The other end of this link is pivotally connected to ears or lugs 16 projected from an operating lever 17 to be presently further referred to.

Fixed in the bar 12 near the last mentioned end thereof, is a tube 20 that extends vertically through the bar and has its upper end turned laterally as at 20'. The lower end of this tube which latter is of hardened steel, is beveled off as shown at $20^a$ so that it may readily pierce the top of the can. This tube is so positioned that it will be in close adjacence to the wall of the can when the device is in place. The bar 12 has also fixed thereto, near the other end thereof and on its underside, a pointed steel member 22 that is adapted to pierce the top of the can, this member being riveted or otherwise conveniently fixed to the bar 12. This member 22 is formed with an aperture 23 extending obliquely therethrough, so that one end of the aperture will be below the can top 10' and the other above said top when the device is in place, this aperture providing an air intake opening in the can.

Referring again to the lever 17, the latter has the link 15 connected thereto at such distance from one end that when the bar 12 is positioned on the can top the lever lies vertically along the side of the can, with the said end engaged under the bead $10^a$ on the can, this end of the lever being preferably beveled to wedge shape as shown. This lever is preferably curved transversely thereof, in correspondence to the curvature of the can wall.

In the use of my improved device, the hook 13 is first caught under the bead $10^a$ on one side of the can and the bar 12 swung downward toward the can; causing the member 22 to pierce the top 10' of the can, it being apparent that the bar acts as a lever to force the member 22 through the can top. When the bar has been swung downward to the position shown in broken lines in Fig. 1 of the drawing, the pointed end of the lever 17 is engaged under the bead $10^a$ and the said lever is swung downward, drawing the bar 12 downward and forcing the end of the tube 20 through the top of the can. The device may remain on the can until the milk has been emptied from the latter.

Figure 5:
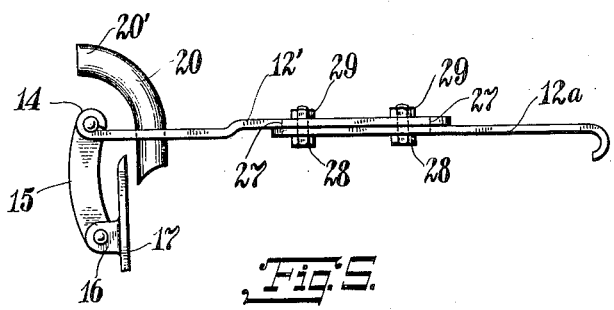
Fig. 5 is a side view showing a slightly modified form of the device.

In Fig. 5 I have shown a modified form of the device. In this construction instead of the single bar 12, I provide a bar made up of two sections 12' and $12^a$ respectively which overlap one another at adjacent ends. These sections are formed with registering longitudinal slots 26 and 27 through which are passed the bolts 28 on which the nuts 29 are threaded, thereby permitting the device to be varied in length for application to cans of different sizes and the device might be extended in use and be applied to cans containing, oil, varnish, alcohol or other liquids.

Having thus described my invention, what I claim as new and desire to protect by Letters Patent of the United States is as follows:

1. A device of the class described comprising a bar having means on one end for engagement with a bead on a cam whereby the bar may be swung as a lever on said bead, and a pair of sharpened members carried on said bar and adapted to pierce the top of the can when the said bar is swung on the said bead toward the said top, one of said members being apertured to provide an air intake opening into the can and the other constituting a discharge tube, one end of a link connected to said bar, and a lever connected to the other end of the said link and adapted to engage under the bead on the can to swing the said bar toward the said can.

2. A device of the class described comprising a bar having a hook on one end for engagement under the bead on the top of a can, a pointed member carried on the underside of said bar near the said end and having an air opening therethrough, a pointed tube carried on said bar near the other end thereof and forming a discharge spout, and a lever member connected to the last named end of the bar for engagement with the said bead to force the pointed end of the said tube through the said can top, and a link forming the connecting medium between the said lever and the said bar.

3. A device of the class described comprising a bar having a hook on one end thereof for engagement under the bead on the top of a can, a pointed member carried on the underside of said bar near the said end and having an air opening extending obliquely therethrough, a tube extending through the said bar near its other end and having a beveled lower end, a link pivotally connected at one end to the said last mentioned end of the said bar, and a lever to which said link is connected at its other end a short distance from one end of the lever, the said end of the lever being adapted to engage under the bead of the can to provide a fulcrum for the lever whereby upon operation of the said lever the said bar may be swung to force the end of the said tube through the top of the can.

In testimony whereof I have affixed my signature.

RUDOLF HAUENSTEIN.